United States Patent
Tengvert et al.

(10) Patent No.: US 10,793,208 B2
(45) Date of Patent: Oct. 6, 2020

(54) MATERIAL HANDLING VEHICLE AND SYSTEM COMPRISING SUCH A VEHICLE

(71) Applicant: Toyota Material Handling Manufacturing Sweden AB, Mjölby (SE)

(72) Inventors: Peter Tengvert, Motala (SE); Henrik Larsson, Motala (SE); Marcus Molin, Linköping (SE); Peter Öjdemark, Borensberg (SE)

(73) Assignee: Toyota Material Handling Manufacturing Sweden AB, Mjölby (SE)

( * ) Notice: Subject to any disclaimer, the term of this patent is extended or adjusted under 35 U.S.C. 154(b) by 1 day.

(21) Appl. No.: 16/262,447

(22) Filed: Jan. 30, 2019

(65) Prior Publication Data
US 2019/0233028 A1    Aug. 1, 2019

(30) Foreign Application Priority Data
Jan. 31, 2018   (EP) .................................... 18154543

(51) Int. Cl.
*B62D 51/00*    (2006.01)
*B62B 3/00*    (2006.01)
(Continued)

(52) U.S. Cl.
CPC .............. *B62D 51/005* (2013.01); *B62B 3/00* (2013.01); *B62B 5/0003* (2013.01);
(Continued)

(58) Field of Classification Search
CPC ...... B62D 51/005; B62D 51/02; B62D 63/04; B62D 61/04; B62D 33/02; B62D 11/04;
(Continued)

(56) References Cited

U.S. PATENT DOCUMENTS

| 7,695,235 B1 * | 4/2010 | Rallis | B65G 67/20 |
| | | | 414/280 |
| 9,075,412 B2 * | 7/2015 | Dixon | G05D 1/0022 |

(Continued)

FOREIGN PATENT DOCUMENTS

| EP | 3355149 A1 * | 8/2018 | ............ B66F 9/0755 |
| EP | 3495246 A1 * | 6/2019 | ............ B66F 17/003 |
| GB | 1 553 292 | 9/1979 | |

OTHER PUBLICATIONS

Extended search report from the European Patent Office, dated Aug. 9, 2018, 5 Pages, for European Patent Application No. 18154543.5.

*Primary Examiner* — Jacob B Meyer
(74) *Attorney, Agent, or Firm* — Quarles & Brady LLP

(57) ABSTRACT

A material handling vehicle comprising: a chassis, comprising an upper surface arranged on a first loading surface, a plurality of components coupled thereto, including; a power source, a drive motor, at least one drive wheel powered by the drive motor, at least one stabilizing wheel, at least one object sensor for detecting objects in the vehicle surroundings, a wireless interface for communication with other system units, a control unit, and a navigation device. The chassis further comprises at least one opening, arranged at a lowermost portion of the chassis, and extending from a first side portion of the chassis. The one opening arranged to receive a material handling element, and comprises an upper abutment surface and sidewalls, extending along the extension of each opening. A material handling system comprises a group of material handling vehicles, the group comprises at least one of the vehicles and at least one forklift truck.

16 Claims, 6 Drawing Sheets

(51) Int. Cl.

| | |
|---|---|
| *B62B 5/00* | (2006.01) |
| *B62D 51/02* | (2006.01) |
| *B62D 63/04* | (2006.01) |
| *B62D 61/04* | (2006.01) |
| *B62D 33/02* | (2006.01) |
| *B66F 9/06* | (2006.01) |
| *B65G 1/00* | (2006.01) |
| *B62D 11/04* | (2006.01) |
| *B66F 9/07* | (2006.01) |

(52) U.S. Cl.
CPC ............ *B62B 5/0033* (2013.01); *B62D 33/02* (2013.01); *B62D 51/02* (2013.01); *B62D 61/04* (2013.01); *B62D 63/04* (2013.01); *B65G 1/00* (2013.01); *B66F 9/063* (2013.01); *B62D 11/04* (2013.01); *B66F 9/07* (2013.01)

(58) Field of Classification Search
CPC ... B66F 9/063; B66F 9/07; B65G 1/00; B65G 1/0492; B62B 3/00; B62B 5/0033; B62B 5/0003
See application file for complete search history.

(56) References Cited

U.S. PATENT DOCUMENTS

| | | | | |
|---|---|---|---|---|
| 9,422,084 | B2* | 8/2016 | Hess | B65G 1/00 |
| 9,944,213 | B2* | 4/2018 | Ambrosio | B60P 1/43 |
| 10,138,101 | B2* | 11/2018 | Svensson | B66F 9/0755 |
| 10,214,354 | B2* | 2/2019 | Toebes | G06Q 10/087 |
| 10,421,474 | B2* | 9/2019 | Jonasson | B66F 5/02 |
| 2006/0011403 | A1* | 1/2006 | Sjoberg | B62D 1/02 |
| | | | | 180/326 |
| 2010/0247275 | A1* | 9/2010 | Karlen | B65D 88/022 |
| | | | | 414/286 |
| 2014/0309809 | A1* | 10/2014 | Dixon | G05D 1/0022 |
| | | | | 701/2 |
| 2015/0368078 | A1* | 12/2015 | Hess | B65G 1/00 |
| | | | | 700/217 |
| 2016/0176638 | A1* | 6/2016 | Toebes | G06Q 10/087 |
| | | | | 700/216 |
| 2016/0289056 | A1* | 10/2016 | Castaneda | B60R 16/033 |
| 2016/0332554 | A1* | 11/2016 | Ambrosio | B60P 1/43 |
| 2017/0015537 | A1* | 1/2017 | Bosworth, III | B66F 9/0755 |
| 2017/0283171 | A1* | 10/2017 | High | B65G 1/0492 |
| 2017/0349197 | A1* | 12/2017 | Jonasson | B62B 3/06 |
| 2019/0233028 | A1* | 8/2019 | Tengvert | B62B 3/00 |
| 2019/0322505 | A1* | 10/2019 | Tengvert | B66F 9/072 |
| 2020/0087127 | A1* | 3/2020 | Hammer | B60W 50/12 |

* cited by examiner

MATERIAL HANDLING VEHICLE AND SYSTEM COMPRISING SUCH A VEHICLE

CROSS-REFERENCE TO RELATED APPLICATIONS

The application claims the priority benefit of EP 18154543.5 filed Jan. 31, 2018, the contents of which is hereby incorporated by reference as if set forth in its entirety.

TECHNICAL FIELD

The present disclosure relates to a material handling vehicle and to a material handling system comprising such a vehicle according to the appended claims.

BACKGROUND

Generally in material handling situations, in particular order picking in a warehouse, floor conveyors, forklift trucks, tiller trucks etc., are used. There are numerous advantages with these types of vehicles, they can be arranged to lift heavy goods, they can be easily operated by a trained operator, they are in general not demanding a considerable investment and they are often rugged and have a considerable life expectancy. It is possible to adapt these vehicles by changing load carriers and also by applying a mast such that goods can be fetched from considerably heights. It is even possible to apply a cabin that is lifted into the air in order to allow for the operator that performs order picking to pick at considerable heights. By order picking at considerable heights the warehouse can be very dense in terms of the base area. It is also possible to help the operator in numerous ways in order to increase the efficiency of order picking. For example it is possible to increase the travel speed of the floor conveyor by allowing the operator to temporarily ride with the floor conveyor on a platform. In order to further increase the order picking efficiency it is possible to provide long forks that can carry two pallets. Thus an operator can pick more orders at the same time and need not unload the single pallet, but can instead continue to pick to the second pallet.

SUMMARY OF THE INVENTION

When utilizing material handling vehicles such as an AGV (Automatic Guidance Vehicle), handling of objects such as pallets and rolling carts may be made easier as such vehicles may alleviate cumbersome operations related to lifting, moving etc. Such vehicles are also often used in combination with a forklift truck and similar equipment, wherein a forklift truck may be used to move the vehicles around, with or without a load, and place and retrieve objects and material at and from such a material handling vehicle. Depending on the design and type of forklift truck used however, it may not always be easy to approach an AGV in a correct manner which may cause problems related to using an AGV and a forklift truck in combination.

Despite prior art there is a need to develop an improved material handling vehicle which is versatile with regards to material handling operations. There is also a need to develop such a material handling vehicle which is easy and efficient to use in combination with different types of forklift trucks. Further, there is also a need to develop a material handling system which comprises and utilizes such a material handling vehicle.

An object of the invention is thus to provide an improved material handling vehicle which is versatile with regards to material handling operations. Another object is respectively to provide such a material handling vehicle which is easy and efficient to use in combination with different types of forklift trucks. An even further object is to provide a material handling system which comprises and utilizes such a material handling vehicle.

According to a first aspect a material handling vehicle is provided. The material handling vehicle may comprise: a chassis, comprising an upper surface on which at least a first loading surface may be arranged. The chassis may further comprise a plurality of components coupled thereto, the components may be; a power source, a drive motor, at least one drive wheel powered by the drive motor, at least one stabilizing wheel, at least one object sensor for detecting objects in the surroundings of the vehicle, a wireless interface for contact with the other units of a system, a control unit, and a navigation device. The chassis of the vehicle may further comprise at least one opening, arranged at a lowermost portion of the chassis, and extending from a first side portion of the chassis. The at least one opening may be arranged to receive a material handling element, and may comprise an upper abutment surface and sidewalls, extending along the extension of each opening.

This may provide a versatile material handling vehicle which has several advantages. Each vehicle may be utilized for a plurality of operations, such as transport of loaded objects, transport of operators or other. Furthermore, the at least one opening provided to the lowermost portion of the chassis of such a vehicle provides several beneficial functions to the vehicle. As this type of vehicle may be used to move objects between other material handling tools and devices such as forklift trucks, floor conveyors, order pickers, stackers, combi trucks or other types of lifting devices, the at least one opening may be used for engagement with such lifting devices. A forklift truck without support legs may easily lift the movable unit by means of inserting the fork of the forklift truck into the at least one opening and engage the fork with the upper abutment surface of the at least one opening. It should be understood that the size of such an at least one opening thus is designed to be large enough to receive such a fork of a forklift truck. A forklift truck may thus lift both a movable unit on its own, or lift a movable unit having an object placed upon the first loading surface. Another advantage is that another type of commonly used forklift trucks, namely floor conveyors, reach trucks, order pickers etc., comprising support legs, arranged so as to extend out underneath the lifting fork, may have several combined usages with such a vehicle. Such a forklift truck may lift up the vehicle in the same manner as a forklift truck with no support legs, but may also further be used to lift up objects such as pallets from the vehicle, wherein the support legs may move freely into the at least one opening. Thereby such a forklift truck having support legs may be moved close to such a vehicle, which would not be possible without the at least one opening arranged in the chassis.

According to an aspect, the at least one opening may be arranged so that a center of gravity of the vehicle is positioned between a first outermost sidewall and a second outermost sidewall of the at least one opening.

This has the advantage that such a vehicle may always be picked up by a forklift truck without the risk of the vehicle tipping over and fall off the fork. It should be understood that a distance between the first and second outermost sidewalls of the at least one channel thus is designed to fit with standard measurements of such forklift trucks. It should be noted that the first loading surface may be arranged at the upper surface of the chassis in such a way that a center of gravity of an object placed thereupon may not shift the accumulated center of gravity of the movable unit and the object combined outside of any of the outermost sidewalls, as long as the object in positioned in a correct manner. This further has the advantage that a forklift truck may lift up the vehicle without the risk of the vehicle falling off the fork, regardless of if the vehicle has a load placed at the first loading surface or not.

According to an aspect the chassis may comprise two openings extending parallel to each other, wherein the first and second outermost sidewalls are sidewalls of separate openings.

This has the advantage that each of the two parallel openings may be made smaller in size wherein custom designed tolerances between the openings and forks and/or support legs of forklift trucks may be provided. Furthermore, the space between the two channels may be utilized in various ways with regards to the design of the vehicle and its internal parts. If heavy internal parts are positioned between the two openings, it may be easier to control the center of gravity for both the vehicle on its own and for the vehicle combined with an object placed at the first loading surface, so as to provide a more reliable and safe alignment of the center of gravity relative the forks of a forklift truck.

According to an aspect the openings may be tunnel shaped, and may extend through the vehicle to a second side portion of the chassis.

This has the advantage that such openings in the form of tunnels may provide all the beneficial features of the openings according to the disclosure from both the first and the second side portion of the chassis.

According to an aspect the chassis of each vehicle, for an embodiment wherein the chassis comprises two first parallel openings, the chassis may further comprise two additional openings, arranged perpendicular relative the two first openings, arranged so that the four openings define four opening intersections, which are positioned so that the center of gravity of the vehicle is positioned in-between the four intersections.

This has the advantage that material handling elements such as forks and support legs of a forklift truck may engage and interact with the vehicle from a plurality of angles, which makes such interactions even easier to perform. As the vehicle and such openings are designed so as to position the center of gravity in-between the four intersections, the center of gravity of the vehicle will thus always be positioned in-between the beams of a fork of a forklift truck if it is to be lifted by such a forklift truck, regardless of which openings are used for a lifting operation.

According to an aspect each edge, wherein an edge being defined by an intersection of a sidewall of an opening and a lower surface of the chassis, comprises roller bearings, arranged horizontally along the longitudinal extension of each edge.

This has the advantage that such a vehicle may move over projections in a floor with ease as the roller bearings may assist the vehicle to roll over such a projection. This may also be beneficial when moving between a horizontal floor surface and an angled ramp or similar in the same manner. This allows for an even more compact design of such a vehicle.

According to an aspect each sidewall of each opening of the chassis comprises a plurality of vertical roller bearings, arranged along each sidewall.

This has the advantage that elements such as forks of a forklift truck or support legs of a forklift truck may be easier to align and insert into such openings. The vertically arranged roller bearings may abut sidewalls of such elements and guide them into the openings due to initiating a rolling contact instead of a blunt mechanical contact between such an element and a sidewall of an opening. Thereby such an element may be easier to insert into such an opening even if an element is approaching an opening at a slight angle.

According to an aspect each opening of the chassis may comprise cooling flanges, connected to at least one heat generating mechanic of the vehicle.

This has the advantage that heat generated from within the vehicle may be discharged in an effective manner while the positioning of such cooling flanges are protected from mechanical damage due to their positioning within such openings. As such cooling flanges are arranged within openings of such a chassis, airflow may easily reach the flanges which providing an efficient cooling of heat generating interior parts within the vehicle. Furthermore, when material handling elements, as for example forks or support legs of forklift trucks, are inserted into openings comprising cooling flanges cooling through the flanges may even be improved as such elements mostly are made of metallic materials which lead away heat effectively.

According to an aspect at least one opening of the chassis may comprise at least one sensor, for detecting material handling elements in a vicinity of the sensor, wherein input from a sensor is used for selective interaction with the material handling elements.

This has the advantage that approaching material handling elements, and also tools, may communicate with the vehicle wherein interaction between the vehicle and a material handling element may be made easier and more efficient. If for example a forklift truck is about to lift either the vehicle or an object loaded onto the vehicle, the vehicle may be selectively programmed to move towards the forklift truck and align itself thereto when the at least one sensor detects elements such as a fork or support legs of a forklift truck. Thereby an operator using such a forklift truck may not need to perfectly align the forklift truck him/her-self which may increase productivity while still lowering the skill needed for an operator of such a forklift truck.

According to an aspect the upper surface of the chassis may comprise connection means, arranged for receiving additional material handling devices.

This has the advantage that the vehicle may be utilized as part of different types of material handling devices and tools, without the need to equip movement related parts and equipment to each such device or tool. Such connection means may be solely mechanical wherein additional chassis or device may be connected thereto. Such connection means may also have integrated power connection means wherein the power source of the vehicle may be utilized for additional devices and functions of the combined material handling vehicle and device/tool. This is beneficial as the vehicle provides versatility for a plurality of combinations and usages related to material handling.

According to an aspect the first loading surface of the chassis may comprise a selectively rotational disc-like portion, wherein the first loading surface may be rotated relative the vehicle.

This has the advantage that objects, which are to be placed upon, or retrieved from, the first loading surface, may be so from any angle of the vehicle. If the vehicle itself is not able to rotate to conform with an orientation of for example a forklift truck, the disc-like portion may rotate the first loading surface instead, wherein loading and retrieval operations may be performed more easily.

According to an aspect the upper surface of a movable unit comprises docking means, arranged to receive a handle for a user riding on top of the vehicle.

This has the advantage that the vehicle may fast and easily be altered between a loading vehicle and a transportation vehicle. Depending on the size of the vehicle, operator and an object, the vehicle may also be used for transportation of an object and an operator simultaneously. Such a handle may be in the form of a strictly mechanical handle mainly for holding onto when riding the vehicle, or be a handle comprising electronics related to operating the vehicle. It should thus be understood that the docking means may be arranged with both mechanical form fitting means and electrical contacts for connection with electronic components related to operation of the vehicle.

According to an aspect at least one opening of a chassis may comprise a charging interface for recharging of the power source.

This has the advantage that such openings may provide additional functionality to the vehicle, wherein the versatility of the vehicle is increased further. Thus corresponding charging stations within for example a warehouse in which the vehicle is used may be established, wherein such charging stations may comprise a corresponding charging interface which the vehicle easily may dock with.

According to an aspect the upper surface of the chassis may comprise a second loading surface, wherein the first and second loading surfaces are arranged at separate heights relative each other.

This has the advantage that the two loading surfaces may be designed to conform to different types of loading objects and/or operations. The loading surface being at a relatively lower height may for example be designed to fit to some types of rolling carts wherein the relatively higher loading surface may be designed to fit to standard sized loading pallets. Thereby each such vehicle may provide a plurality of functions related to loading and transporting operations within for example a warehouse, which eliminates the need for having a plurality of vehicles of various designs, each designed for only one specific task.

According to an aspect each edge, wherein an edge being defined by an intersection of a sidewall of an opening and a lower surface of the chassis, is a bevelled edge.

This has the advantage that sharp angles of such edges are avoided, which may alleviate problems with the vehicle getting stuck when moving over projections in a floor, or when moving between a horizontal floor surface and an angled ramp or similar. This allows for an even more compact design of such a vehicle.

According to an aspect a material handling system is provided. The system may comprise a group of material handling vehicles according to the disclosure, wherein the group may comprise at least one of the vehicles and at least one forklift truck.

This has the advantage that a material handling system may be provided with all the beneficial features related to the material handling vehicle as defined within the disclosure. A versatile material handling system is thus presented, which system may be utilized for a plurality of material handling operation, wherein interaction between the units (vehicles and forklift trucks) may be performed easily and efficient while still being executed in a safe and reliable manner.

Additional objectives, advantages and novel features of the invention will be apparent to one skilled in the art from the following details, and through exercising the invention. While the invention is described herein, it should be apparent that the invention may be not limited to the specifically described details. One skilled in the art, having access to the teachings herein, will recognize additional applications, modifications and incorporations in other areas, which are within the scope of the invention.

BRIEF DESCRIPTION OF THE DRAWINGS

Below is a description of, as examples, embodiments with reference to the enclosed drawings, in which.

DETAILED DESCRIPTION

Figure 1A:
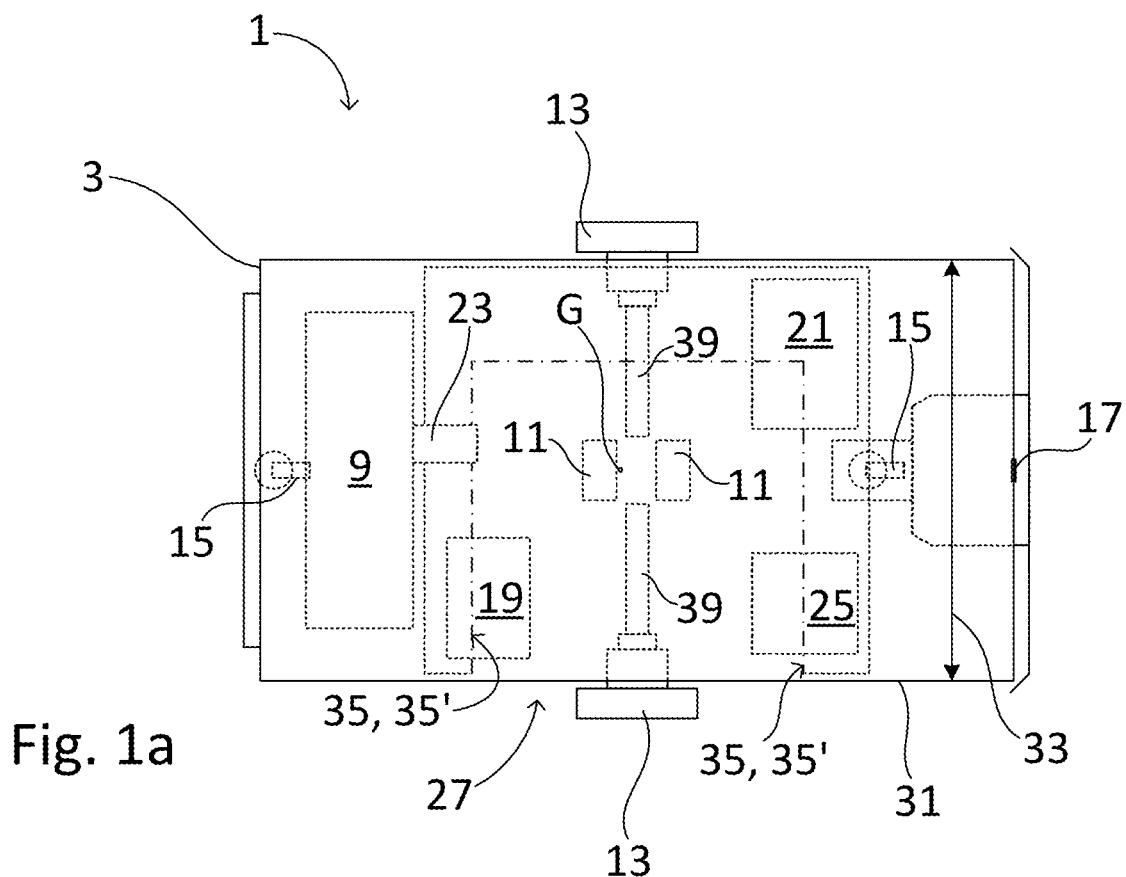
FIGS. 1a and 1b show a vehicle in a top down view and a side view respectively according to an embodiment.

According to a first aspect a material handling vehicle is provided. The material handling vehicle may comprise: a chassis, comprising an upper surface on which at least a first loading surface may be arranged. The chassis may be made of a robust and wear resistant material such as a suitable metallic material or an alloy. The vehicle may be of various shapes and designs, but may generally be perceived as a rectangular in shape, or close to rectangular, wherein the chassis define the outer profile of the shape of the vehicle. The first loading surface which is arranged at the upper surface of the chassis may be utilized for placing of objects and also for operators to stand upon, wherein both the objects and operators may be transported around a warehouse or similar by means of such a vehicle.

The chassis may further comprise a plurality of components coupled thereto, the components may be; a power source, a drive motor, at least one drive wheel powered by the drive motor, at least one stabilizing wheel, at least one object sensor for detecting objects in the surroundings of the vehicle, a wireless interface for contact with the other units of a system, a control unit, and a navigation device. As should be obvious, the components listed herein are components known in the arts when viewed individually, wherein variations of the number of such components, their positioning and configuration may be modified in various ways without deviating from the scope of protection defined within the disclosure. Some variations will be shown in more detail with reference to the accompanied figures. The vehicle may further comprise two drive motors, wherein one drive motor may be coupled to an individual drive wheel for example. If providing two driving wheels having a drive motor coupled to each wheel, both such wheels may be operated individually wherein the vehicle may be able to rotate on the spot in an easy manner. The power source may be any power source known in the arts, such as a battery or a plurality of batteries, which may be re-chargeable or replaceable. Furthermore, the term chassis may be perceived as structure, framework, casing, housing or a combination of such, so that chassis is to be viewed as the collective term for the body of the vehicle, to which body the other structural parts of the vehicle is assembled.

In general the vehicle may comprise the components necessary for operation, wherein some modifications may be possible, which should be obvious. A total sum of wheel may preferably be three or more, so as to provide a vehicle which may stand still at a flat surface. For such cases both one drive wheel and two stabilizing wheels may be possible to use, as well as two driving wheels and one stabilizing wheel. Four or more wheels total may of course also be used depending on the desired properties for the assembled vehicle. Two driving wheels and two stabilizing wheels may be perceived as preferred embodiment if the wheels may be positioned such a way that the vehicle may be balanced both with and without loads thereon.

The chassis of the vehicle may further comprise at least one opening, arranged at a lowermost portion of the chassis, and extending from a first side portion of the chassis. The at least one opening may be arranged to receive a material handling element, and may comprise an upper abutment surface and sidewalls, extending along the extension of each opening. Such an opening may thus be perceived as an orifice in the first side portion of the chassis, and extending into the interior volume of the vehicle. The extension of the opening is thus defined by the upper abutment surface and the sidewalls, wherein the opening is uncovered at a lower portion thereof, so as to define a gap in a lowermost surface of the vehicle and providing clearance between the upper abutment surface and a floor surface on which the vehicle is positioned. It should also be noted that the first side portion of the chassis may be perceived as any side portion of the chassis regardless of the overall shape of the chassis. Hence, if the chassis have a substantially rectangular shape, the first side portion may be perceived as either a short side portion or a long side portion with regards to such a rectangular shape.

The opening of the chassis may thus allow for material handling elements of tools and devices to be inserted therein, and thus enabling such elements to be positioned underneath the vehicle, and to engage the upper abutment surface of the at least one opening. As the material handling vehicle may be designed having low height, small tolerances with regards to a distance between the lowermost surface of the vehicle and a floor may be very small. Furthermore, as the different types of wheels generally needs to be arranged partly within the vehicle so as to achieve the low height and small tolerances, inserting material handling elements would not be possible without the at least one opening of the chassis.

The vehicle comprising the at least one opening provides an excellent utility for the vehicle when used in combination with different types of forklift trucks. Counterweight forklift trucks may lift the vehicle due to the at least one opening making it possible to insert the fork of the forklift truck into the at least one opening and thus positioning the fork in a proper lifting position.

Furthermore, forklift trucks comprising support legs with wheels, wherein such support legs are used so as to prevent the forklift truck from tipping over, as the load lifted by such a forklift truck will have its center of gravity within the area defined by the contact points between an underlying floor and the wheels of the forklift truck, may be used to position and retrieve objects from the vehicle. Such a forklift truck will thus require clearance underneath an object it is to pick up or place down, as the support legs needs free space to extend over. The at least one opening of the chassis of the material handling vehicle may thus provide such space and clearance wherein the support legs may be inserted into the openings which allow the lifting fork of the forklift truck to be positioned correctly for such operations relating to an object lifted from or positioned at a loading surface of the vehicle.

According to an aspect, the at least one opening may be arranged so that a center of gravity of the vehicle is positioned between a first outermost sidewall and a second outermost sidewall of the at least one opening. The size and shape of the at least one opening may be varied in detail, but while maintaining this feature the engagement of the vehicle and a forklift truck (or other types of material handling elements/devices) will always provide a proper combined engagement of the two. Preferable the first loading surface at the upper surface of the chassis is also designed to align with its center within the area between the first and second outermost sidewalls. Thus the center of gravity may never end up outside of any type of element related to a lifting device, wherein such operations may be performed in a safe and reliable manner. This feature may be provided to the vehicle in various ways, depending on the desired overall design of the vehicle. If it is desired to have the at least one opening as close to a center of the vehicle as possible, then the internal parts may be spread out within the chassis as evenly as possible with regards to their weight. If it is desired to provide an as small and compact vehicle as possible, wherein the center of gravity ends up off center relative the chassis, then the at least one opening may correspondingly be arranged off center so as to provide the desired feature. Counterweights may also be arranged within the vehicle so as to shift the center of gravity in a favourable direction for its design.

According to an aspect the chassis may comprise two openings extending parallel to each other, wherein the first and second outermost sidewalls are sidewalls of separate openings. Thus the two openings may be designed to fit one fork element of a fork, or one support leg of a forklift truck each. Thus two such openings may be designed with specific and small tolerances wherein no unnecessary internal space of the vehicle is wasted. Thus further enhances a small and compact design of the vehicle. The two opening do not necessarily be of identical size, shape and overall the design. The only needed criteria is that a fork and/or support legs of a forklift truck may be inserted into the two openings simultaneously. One opening may be different in design, due to other design requisites related to the vehicle and/or chassis, such as comprising other features or functions into one of the two openings. The openings and the remainder of the vehicle may also be designed in various ways so as to shift the center of gravity of the vehicle, either alone or combined with a hypothetical object placed thereupon, towards a more desirable position. Two openings may thus give rise to at least four sidewalls, wherein the two outermost sidewalls hence will be defined as the two outermost sidewalls of all sidewalls of both openings.

According to an aspect the openings may be tunnel shaped, and may extend through the vehicle to a second side portion of the chassis. The at least one opening in the form of at least one tunnel may thus provide the same features and function of the at least one opening from both the first and the second portion of the chassis. All additional features relating to the at least one opening as disclosed herein may thus be arranged so as to be utilized from both sides of such at least one tunnel passing through the vehicle. Such an at least one tunnel may be designed with some variation with regards to a distinct shape and size, the only required feature of such an at least one tunnel being that it comprises an upper abutment surface and connecting sidewalls. By means of having the openings of vehicles being arranged as tunnels extending through the vehicles, a forklift truck (or other) may thus also insert its fork or support legs into the tunnels wherein the fork or support legs may protrude out from the opposite side relative the side from which it is being inserted. This may allow for a more secure positing of the forklift truck and its appendages relative the center of gravity of the vehicle, which in turn promotes safer and more reliable material handling operations when using such a vehicle in combination with such a forklift truck. This may also be utilized when operating a forklift truck for performing a material handling operation combined with two or more such vehicles, depending on the comparative sizes of the vehicle and the forklift truck. If the fork of a forklift truck is large enough for being combined with a plurality of vehicles, such vehicles may be positioned adjacent each other, either manually or automatically by means of the wireless interface, the control unit and the navigation device of each vehicle, wherein the forklift truck may insert its appendages (such as fork or support legs) into a plurality of adjacent vehicles simultaneously. This may thus be utilized to increase efficacy and cut down on time need to perform such operations related to material handling.

According to an aspect the chassis of each vehicle, for an embodiment wherein the chassis comprises two first parallel openings, the chassis may further comprise two additional openings, arranged perpendicular relative the two first openings, arranged so that the four openings define four opening intersections, which are positioned so that the center of gravity of the vehicle is positioned in-between the four intersections. Such four openings may extend through the vehicle in the form of tunnels extending from one side of the vehicle towards an opposite side, or they may only partly extend through the vehicle, as long as they extend far enough to establish the defined intersections. Other variations are also possible, as for example two openings extending through the chassis in the form of tunnels, wherein the two perpendicularly arranged openings extend only partly and extend only a distance from a side portion, which distance is long enough to establish the mentioned intersections but not long enough to reach the opposite side from where such openings are initiated in the chassis. For a vehicle having a substantially rectangular base, any combination of such intersecting openings and/or tunnels may be possible with regards to the long and short side relating to the rectangular shape. The chassis of the vehicle comprising openings from perpendicular directions in such a manner allows for interaction with additional material handling elements and/or devices (such as forklift trucks) from a plurality of angles which may be beneficial as navigation of such a vehicle with regards to such elements and/or devices may be faster and easier.

According to an aspect each edge, wherein an edge being defined by an intersection of a sidewall of an opening and a lower surface of the chassis, comprises roller bearings, arranged horizontally along the longitudinal extension of each edge. This feature may a similar function/advantage as shaping the edge as a belled edge which has been described previously. By means of arranging roller bearings at the edges the risk of the vehicle getting stuck at objects and/or debris may be lowered even further compared to such a bevelled edge as roller bearings may easily avoid friction inducing contact due to their rotating properties. The roller bearings may be of various sizes, wherein a single roller bearing may be arranged if the radius of the roller bearing is deemed a proper size for constituting the same radius to the edge of the opening. A plurality of smaller roller bearing may also be arranged in series adjacent each other so as to provide any desired shape for the edge, but at the same time provide rolling properties over a larger area of the part of the chassis where the roller bearings are being arranged. A plurality of smaller roller bearings arranged adjacent each other in this manner may also provide the advantage that a lesser volume of the bearings are protruding into an internal volume of the chassis.

According to an aspect each sidewall of each opening of the chassis comprises a plurality of vertical roller bearings, arranged along each sidewall. Such roller bearings may be spread out evenly along the sidewalls, so as to assist in guiding material handling elements such as forks and support legs of forklift trucks into the at least one opening. This may make it possible to manufacture the vehicle with smaller tolerances with regards to such material handling elements, as rolling contact is provided by the roller bearings. Material wear may also be lowered due to such rolling contact instead of metal-metal contact of a regular sidewall and a material handling element of metal. The roller bearings may also be more prominent closer to the side portions of the chassis, so as to allow for both more guidance when inserting an element into the at least one opening, but also for allowing such an element to approach the at least one opening at a slight angle wherein a rolling contact initiated at the initial portion of the at least one opening may assist in shifting the relative positioning of an element and an opening so that the element gets inserted into the extension of the opening at its correct angle. The roller bearing may also be provided with a resilient type of material as a coating, and/or be arranged to the chassis by means of resilient elements such as springs and/or shock absorbers, wherein such resilient types of bearings may fit snugly towards an inserted material handling element if so is desired.

According to an aspect each opening of the chassis may comprise cooling flanges, connected to at least one heat generating mechanic of the vehicle. As heat may be generated from various sources within a vehicle, such as from the work of the drive motor, mechanical friction in moving parts of the vehicle, the power source heating up over time, etc., dissipating or discharging such heat is generally good for the longevity of the machinery, and sometimes absolutely needed to avoid overheating of sensitive machine parts. Metal cooling flanges are often used in various machines and devices for the inherent heat conducting properties of metal, wherein heat thus is lead away from the heat source by means of the flanges, wherein the increased surface area of the flanges allows for a more efficient cooling when air flows of the surface area. By means of arranging such cooling flanges at, or in close proximity to, the at least one opening, air flow reaching such cooling flanges may be improved due to the open properties of the opening and the gap in the chassis therefrom. Such a cooling function may also be even further improved by means of arranging fans adjacent such cooling flanges. Fans may further assist in keeping the interior surfaces of the at least one opening clear from dust and debris which may accumulate there over time. The cooling flanges may even be arranged in such a way that they are to get into contact with material handling elements being inserted into the at least one opening, wherein contact of the two, which generally would be a metal-metal contact would increase the heat discharge as the large volume of heat conducting material of the material handling element would be able to absorb a lot of heat from the heat sources of the vehicle.

According to an aspect at least one opening of the chassis may comprise at least one sensor, for detecting material handling elements in a vicinity of the sensor, wherein input from a sensor is used for selective interaction with the material handling elements. The sensor may be any type of sensor known in the arts which may detect objects of various kinds within its vicinity. As the vehicle generally comprises at least one sensor for detection of objects in the surrounding of the vehicle, the plurality of sensors may communicate and work together so as to provide more information relating to the surroundings of the vehicle. This may be utilized for pure collision prevention, but also be used as a means of semi-automatic movement of the vehicle when used in different types of work operations. If, as an example, a forklift truck comprising support legs is approaching the vehicle to retrieve an object placed thereupon, a sensor arranged at the at least one opening may be able to detect the support leg as it approaches. If the operator of the forklift truck has made a slight error in aligning the forklift truck towards to vehicle, the sensor may detect the misalignment and send a signal to other internal parts of the vehicle so as to correct the misalignment. The sensor may send its information to the control unit and the navigation device, wherein the vehicle may be given a move command to automatically correct its positioned relative the forklift truck. The information from the sensor may also be sent to the operator in the forklift truck by means of the wireless interface, if the forklift truck is equipped with a corresponding interface. Thereby an efficient control system may be implemented for such combined use of a vehicle and a forklift truck, wherein an operator of the forklift truck may get relevant direct information regarding the positioning of the forklift truck and the vehicle, and also be assisted in such positioning with a semi-automatic movement system which alleviates working operation for this type of combined usage.

According to an aspect the upper surface of the chassis may comprise connection means, arranged for receiving additional material handling devices. Such connection means, which may be purely mechanical or mechanical as well as connecting the electronics of the vehicle to other additional devices being connected thereto, may provide the functionality of the vehicle to be used as a hub for a plurality of combined vehicles. By means of using the driving and navigation means from within the vehicle, it may easily be modified by connecting other exterior chassis to the vehicle which may then act a base for another vehicle having modified functions and usages. Such other combined vehicles may be as simple as connecting a larger chassis to the chassis of the vehicle to provide a larger loading surface, or a plurality of loading surfaces. The connection means may also be used to connect additional tools which may be useful for work related to material handling. The connection means may be designed as form fitting means which snap lock together without the need for tools. A variety of locking devices may further be comprised so as to ensure a secure attachment of an additional external chassis and/or devices thereto.

According to an aspect the first loading surface of the chassis may comprise a selectively rotational disc-like portion, wherein the first loading surface may be rotated relative the vehicle. The disc-like portion may be a portion of first loading surface, or the first loading surface in its entirety. If the vehicle comprises a plurality of loading surfaces, the rotating feature provided by a disk-like portion may of course be comprised in any of the loading surfaces or all of them. If the selectively rotational disk-like portion is arranged as part of a loading surface, such a disc-like portion may further comprise a lifting device which lifts to disc-like portion upwards relative the remainder of such a loading surface, so as to avoid an object placed thereupon to drag against the non-rotational portion/portions of such a loading surface. The disc-like portion is thus slightly elevated from the upper surface of the chassis, rotated to a desired angle and then lowered back to its original height, wherein an object placed thereupon achieves a correct positioning. For the example of a pallet being loading onto a loading surface of the vehicle, this feature may be very beneficial, especially in warehouses which are crowded with lesser free space to navigate within. The vehicle itself may often exhibit a substantially rectangular base area, wherein such a vehicle may drive though narrow spaces in only its narrower width. This may result in the vehicle being required to move and be positioned in a certain direction at certain locations within such a warehouse. By means of comprising the selectively rotational disc-like portion into the chassis and/or a loading surface, a forklift truck or a similar material handling device or tool may not be as restricted in combined usage with a vehicle under such conditions. The loading of object, from or to such a vehicle may be performed even if the angle of loading is separate to the driving orientation of the vehicle, due to the selective rotation of the loading surface, in full or in part. The feature may also be utilized to increase efficacy in operation if a selective rotation of the disc-like portion is faster and easier to perform compared to turning the entire vehicle. The disc-like portion may further be in communication with other parts of the vehicle such as sensors of various kind, wherein such sensors may detect adjacent loading surfaces and/or material handling elements or tools in the vicinity, wherein the control unit of the vehicle may be programmed to rotate the disc-like portion when the vehicle approaches such surfaces, elements or tools. Thus the disc-like portion may pre-set an orientation of an object placed thereupon during movement of the same when it is being moved towards allocation for an upcoming material handling operation. Thereby a very efficient and versatile material handling vehicle and process is provided.

According to an aspect the upper surface of a movable unit comprises docking means, arranged to receive a handle for a user riding on top of the vehicle. Such a handle may be designed as a handle similar to that of a bicycle or similar, wherein such a handle may comprise a handlebar for holding on to. The handle may also be of a simpler design comprising only a vertical shaft for holding on to, or a vertical shaft comprising a handle protruding from the shaft. Selective attachment and de-attachment of a handle may quickly alter the function of the vehicle between a transport vehicle for object and a transport vehicle for operators riding thereon. The handle may comprise a control device for providing manual control of the vehicle when the handle is attached to the vehicle. Such a control function may further be expanded for when the vehicle is part of material handling system comprising a group of a plurality of such vehicles, wherein the vehicle being provided with a handle thereat may act a master unit and the remainder of the units may be perceived as slave units, wherein an operator may operate and navigate the master unit and wherein the slave units may be ordered to follow the master unit in its track or similar.

According to an aspect at least one opening of a chassis may comprise a charging interface for recharging of the power source. The power source may of course be any sort of power source known in the arts, but may preferably comprise a rechargeable battery or similar. It may thus be beneficial to incorporate a charging interface within the at least one opening of a vehicle. Such a charging interface may be well protected due to an arranged within the at least one opening where impacts with surrounding objects are less likely to occur. Furthermore, charging stations for such a charging interface may be easy to provide to a warehouse using a plurality of such vehicles. For example a floor mounted rail comprising a magnetic charging interface may be used wherein a vehicle comprising a corresponding magnetic charging interface may simply be positioned with the rail conforming to the at least one opening of the vehicle wherein charging may be initiated. Other types of charging methods and interfaces may of course also be used without deviating from the scope of the disclosure.

According to an aspect the upper surface of the chassis may comprise a second loading surface, wherein the first and second loading surfaces are arranged at separate heights relative each other. Generally the two loading surfaces are arranged laterally adjacent each other however other configurations may also be possible without deviating from the disclosure. Having two laterally adjacent loading surfaces of separate heights provides a sort of stairs-shaped profile for the chassis and thus the vehicle. Such a profile may be utilized when an operator climbs on and off the vehicle, wherein climbing on/off may be performed in two smaller steps rather than one larger one. This will result in gentler climb with respect to various parts of the human body, for an operator who performs such climbs. The two separate loading surfaces may be specifically designed in height, shape and size to be suitable for different types of material handling operations and/or loading elements such as pallets, carts, boxes, or similar. The vehicle may also be designed so as to making the lower of the two loading surfaces suitable for standing on and the higher of the two being suitable for loading. This provides a versatile vehicle which may be used with ease but being very efficient for loading operations comprising loading an object at one loading surface and leaving space for an operator to ride on the vehicle at the other loading surface. This feature may further be expanded on so as to comprise a driver interface of some sort, like for example having pedals, buttons or levers at the loading surface specifically designed for allowing an operator to ride thereupon. The heights of the individual loading surfaces, and the difference in height between the two, may vary depending on the desired characteristics and features of the vehicle, and also vary depending on the potential usages for the vehicle. Generally it is more desirable to manufacture the vehicle as low and compact as possible, wherein the chassis may be modified and/or additional shim elements/parts may be attached to one or both of the loading surfaces if any of the heights are to be modified. An additional advantage of having a plurality of loading surfaces at different heights is that the sensor for detecting objects in the surrounding of the vehicle may be positioned in the chassis at the higher of the loading surfaces, which may provide a better viewing angle for the sensor, as it may be slightly angled downwards from such a relatively elevated position within the chassis.

According to an aspect each edge, wherein an edge being defined by an intersection of a sidewall of an opening and a lower surface of the chassis, is a bevelled edge. By the term bevelled edge it should be understood that this may refer to an edge having an angled shape, a rounded shape, a multi-angled shape or other similar shapes. A bevelled edge may be beneficial with regards to the mechanical integrity of the chassis, as sharp bends or similar may accumulate mechanical and/or manufacture induced stress in the material of the chassis. Furthermore, as the at least one opening provides a gap in the chassis, between the sidewalls of the at least one opening, the openings may be utilized beneficially when operating the vehicle over uneven terrain. When used in a warehouse to transport object etc., there may be projections in the floor, or edges related to ramps having angles or similar. Depending on the size, shape and placement of the at least one opening in the chassis, the at least one opening may be utilized so as to allow the vehicle to run over larger projection or sharped ramp edges, by means of positioning the wheels and the at least one opening in such a way that such projections and/or edges protrude into the at least one opening during a brief period of time, when the vehicle is pivoting over such a projection and/or edge. Thus a bevelled edge may further this by slightly increasing an allowed size for such a projection and/or edge, as a bevelled edge may shave off a part of the volume of the chassis which otherwise could get stuck at such a projection and/or edge.

According to an aspect a material handling system is provided. The system may comprise a group of material handling vehicles according to the disclosure, wherein the group may comprise at least one of the vehicles and at least one forklift truck. Such a system may thus be comprised of a large variety of numbers of vehicles and forklift trucks wherein the number of vehicles and the number of forklift trucks may vary independently without deviating from the scope of the disclosure. The vehicles may be identical with regards to features and functions of individual vehicles, or be provided with different features according to needs for operations they are to be used for. One vehicle may be used as a master wherein the remainder of the vehicles may be given a slave rank, so that the master unit may be primarily controlled wherein the slave units function as assisting units to the master. One vehicle unit of the group may also be assigned as an assist unit for a certain forklift truck, wherein such a vehicle may be programmed to follow and assist that specific forklift truck primarily. As should be obvious, the wireless interface, control unit, navigation device and the at least one object sensor of each unit may communicate with other vehicles and forklift trucks or other devices such a central command center, a wireless control device or similar. The material handling system in full may thus be used for a large variety of material handling operations and also be controlled, either as a group of units or individually in a variety of ways. Thereby a versatile material handling system is provided, which system utilizes a plurality of similarly versatile material handling vehicles, wherein each such vehicle comprises at least one opening at a side portion of the chassis, which gives rise to the several advantageous features according to the present disclosure.

The detailed description with reference to the embodiments depicted are to be viewed as exemplary embodiments comprising a combination of certain features, which features have been described in detail above. It is thus to be understood that additional embodiments may be achieved by combining other features into embodiments not depicted herein. The figures are to be viewed as examples and not mutually exclusive combinations. It should also be noted that all figures shown and described are schematically represented, wherein generic parts of machinery is not depicted for the sake of simplicity.

Figure 1B:
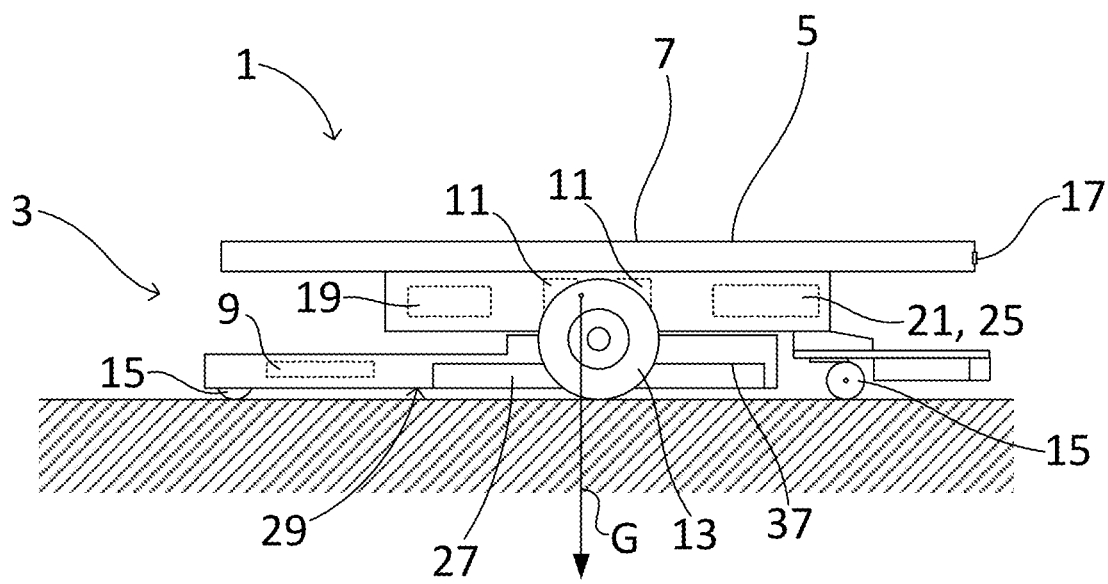

FIGS. 1a and 1b show a vehicle 1 in a top down view and a side view respectively according to an embodiment. The vehicle 1 may as depicted in FIG. 1a and FIG. 1b comprise a chassis 3 comprising an upper surface 5 on which a first loading surface 7 is arranged. The chassis 3 may further comprise additional other details such as metal and/or plastic plates so as to cover the machinery and the internal parts, however such details are not shown in the figures. The vehicle 1 further comprises a plurality of components, namely for this embodiment being; a power source 9, two drive motors 11, connected to one individual drive wheel 13 respectively, two stabilizing wheels 15 in the form of swivel wheels, an object sensor 17 for detection of surrounding objects, a control unit 19, a navigation device 21, a charging interface 23 for the power source 9, and a wireless interface 25 for communication with other units of a system in which the vehicle 1 may be comprised. The total of four wheels 13, 15, wherein two are drive wheels 13 and two are stabilizing wheels 15, provides a vehicle 1 with high manoeuvrability, due to the two drive wheels 13 being individually operated and the two stabilizing wheels 15 being swivel wheels.

The components listed herein are arranged and positioned within the vehicle 1 so as to further allow for an opening 27 in the chassis 3, arranged at a lowermost portion 29 of the chassis 3. As is seen in FIG. 1*a* the opening 27 extends from a first side portion 31 of the chassis 3 and further extends to about three quarters of a width 33 of the vehicle 1. FIG. 1*b* shows how the opening 27 provides a cavity underneath the vehicle 1, which cavity is defined by the sidewalls 35 and the upper abutment surface 37 of the opening 27 and the underlying floor beneath the vehicle 1. As has been explained, such an opening 27 may be utilized by means of inserting material handling elements, such as a fork or support legs of a forklift truck therein. According to this embodiment the drive wheels 13 and drive axles 39 connected thereto may extend down into the opening 27, but in an area where material handling elements will not be inserted. A charging interface 23 for the power source 9 is further also comprised at one of the sidewalls 35 of the opening 27, wherein the opening 27 may be utilized for re-charging as explained. Furthermore, the components and the overall assembly of the vehicle 1 is such designed so that the center of gravity G of the vehicle is positioned in-between the two outermost sidewalls 35' of the opening 27, wherein the opening 27 is arranged in the vehicle 1 in a suitable position for using the vehicle 1 in combination with a forklift truck or similar.

Figure 2A:
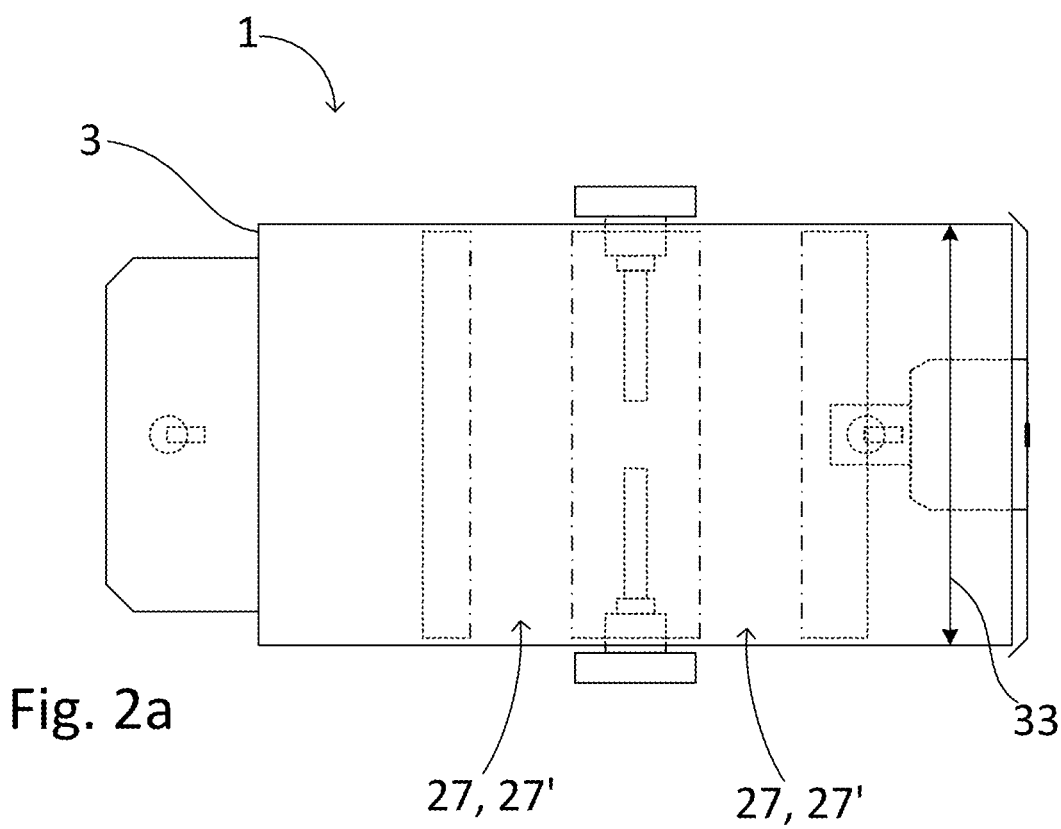
FIGS. 2a and 2b show a vehicle in a top down view and a side view respectively according to an embodiment.
Figure 2B:
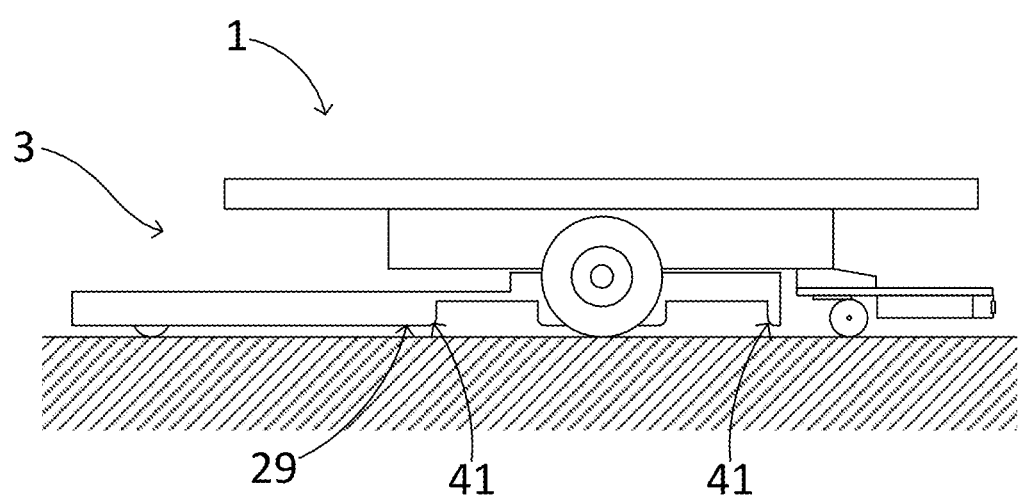

FIGS. 2*a* and 2*b* show a vehicle 1 in a top down view and a side view respectively according to an embodiment. For the sake of simplicity internal components such as the control unit, power source and such are not depicted herein. Focus is instead to be directed to the additional features relating to the at least one opening 27 of the chassis 3. The vehicle 1 may, as depicted in FIGS. 2*a* and 2*b*, comprise two openings 27 which are shaped as tunnels 27' and extend through the full width 33 of the chassis 3. Thereby a forklift truck or similar may approach the vehicle 1 from both sides instead of only from one side, if compared to the embodiment of FIGS. 1*a* and 1*b*.

Furthermore, each edge 41 wherein an edge 41 being defined by an intersection of a sidewall 35 of an opening 27 and the lowermost portion 29 of the chassis 3, is a bevelled edge 41. As is seen in FIG. 2*b*, the four edges 41 comprise a rounded shape, but other shapes such as angled or multi-angled may also be used. Such bevelled edges 41 provide an improved ground clearance for the vehicle 1 as sharp edges are avoided, which sharp edges could risk getting stuck at smaller objects on the floor.

Figure 3A:
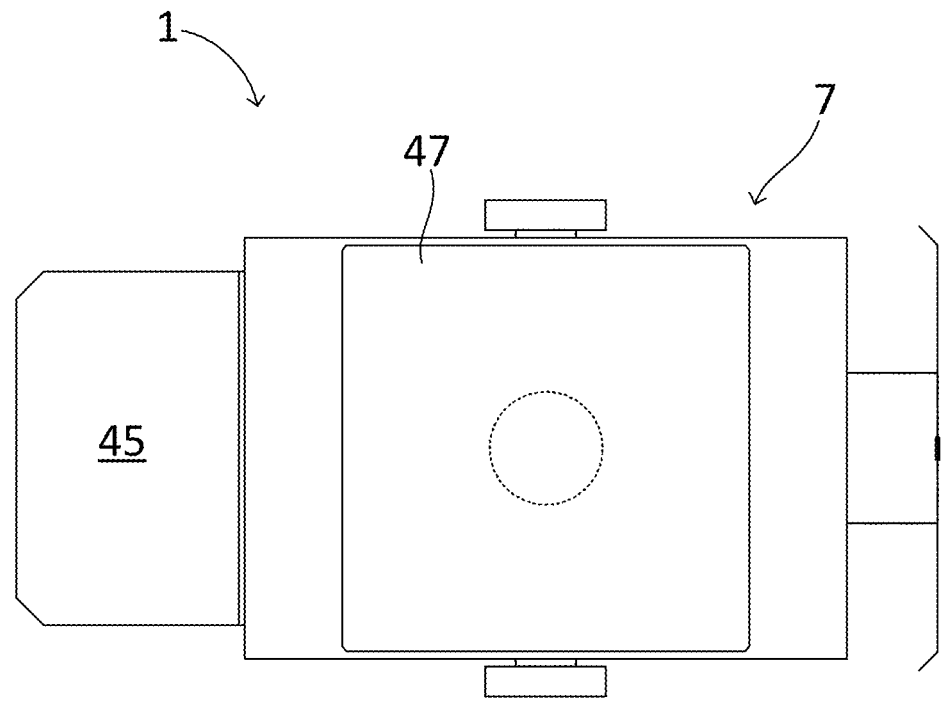
FIGS. 3a and 3b show a vehicle in a top down view and a side view respectively according to an embodiment.
Figure 3B:
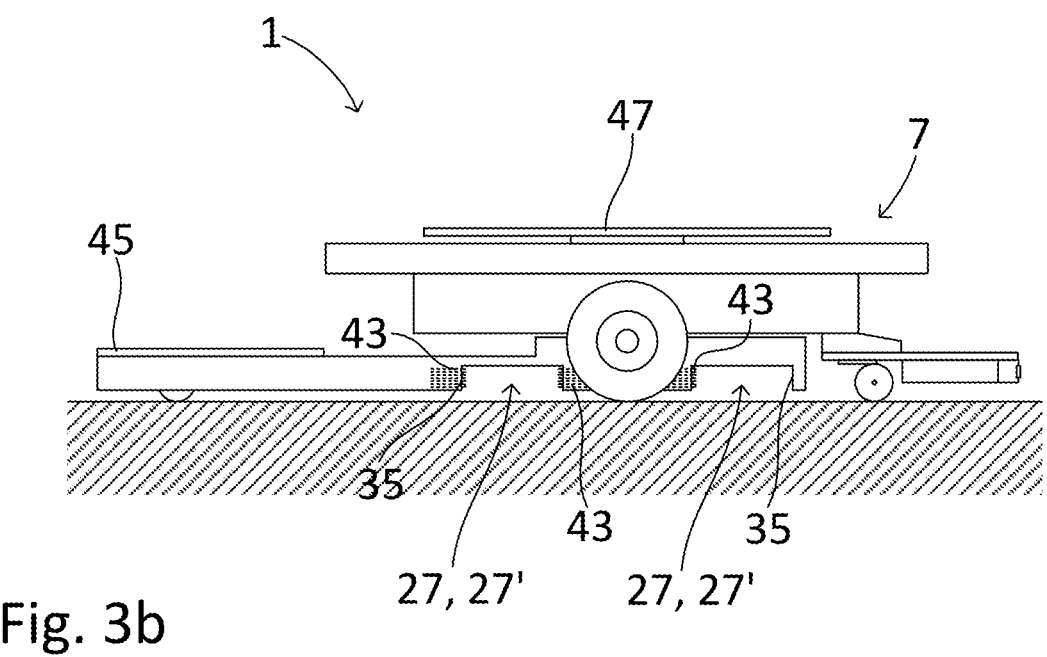

FIGS. 3*a* and 3*b* show a vehicle 1 in a top down view and a side view respectively according to an embodiment. The embodiment shown herein is similarly to the embodiment of FIGS. 2*a* and 2*b* depicted without all the internal components of the vehicle 1. The vehicle 1 according to FIGS. 3*a* and 3*b* comprises two openings 27 in the form of tunnels 27' extending through the chassis 3, which is shown in FIG. 3*b*. FIG. 3*b* further shows a plurality of cooling flanges 43, connected to at least one heat generating mechanic and/or device of the vehicle 1. By means of their positioning at the sidewalls 35 of the two tunnel-shaped openings 27 airflow may easily reach the flanges 43, and when material handling elements of metallic material is inserted into the tunnels 27', heat may efficiently be transferred by means of a provided metal-metal contact.

The vehicle of FIGS. 3*a* and 3*b* further comprise a second loading surface 45, wherein the first and second loading surfaces 7, 45 are arranged at separate heights relative to each other. The two loading surfaces 7, 35 having separate heights may thus be utilized for specialized individual material handling operations. Furthermore, the first loading surface 7 further comprises a selectively rotational disc-like portion 47, wherein the first loading surface 7 may be rotated relative the vehicle 1.

Figure 4A:
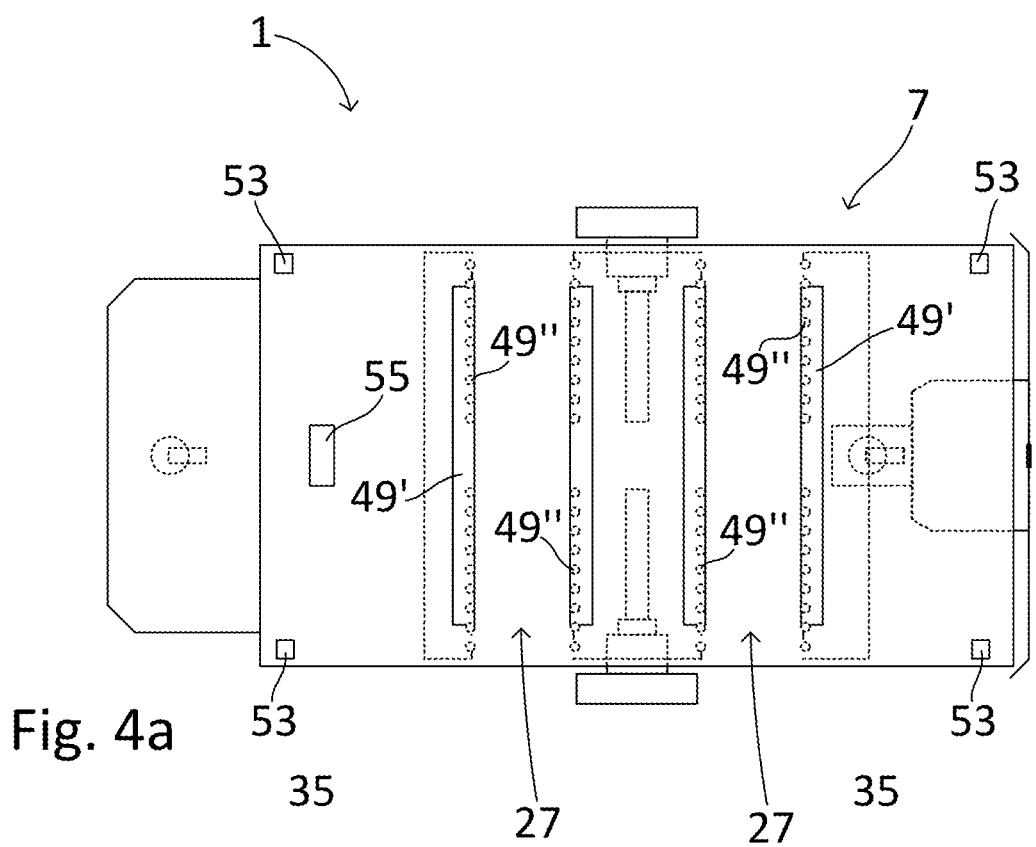
FIGS. 4a and 4b show a vehicle in a top down view and a side view respectively according to an embodiment.
Figure 4B:
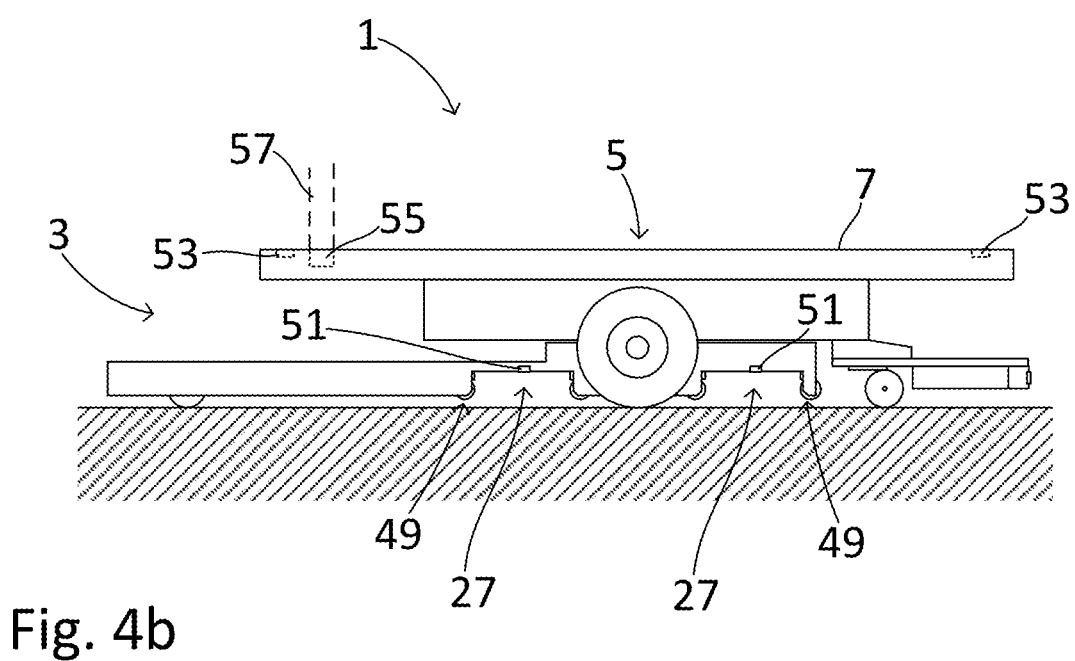

FIGS. 4*a* and 4*b* show a vehicle 1 in a top down view and a side view respectively according to an embodiment. The embodiment depicted herein comprises roller bearings 49 arranged in the two tunnel-shaped openings 27. Two types of roller bearings 49 are comprised. Each edge 41, comprises first roller bearings 49', arranged horizontally along the longitudinal extension of each edge 41. Furthermore, each sidewall 35 of each opening 27 of the chassis 3 comprises a plurality of vertical second roller bearings 49", arranged along each sidewall 35. This may assist in alleviating the risk of the vehicle 1 getting stuck, and insertion of material handling elements respectively, as described prior.

The embodiment of FIGS. 4*a* and 4*b* further comprises two sensors 51, arranged at the two tunnel-shaped openings 27. As has been explained within the disclosure, such sensors 51 may be utilized in a variety of ways to make material handling operations faster, easier and more efficient.

The chassis 3 of this embodiment further comprises connection means 53, arranged for receiving additional material handling devices. The connection means 53 as shown in FIG. 4*a* are arranged in the vicinity of the four corners of the first loading surface 7. As has been previously described, the connection means 53 may be strictly mechanical so as to be used in combination with an exteriorly positioned additional chassis or similar, or to attach an additional loading surface element which may be larger in size, comprising specially designed form fitting means for a certain object to be placed thereon or other. The connection means 53 thus makes the vehicle 1 ideal for using as a base for a plurality of vehicles, if vehicles of various desired functions are desired. The connection means 53 may be positioned at other locations of the chassis 3, and the number of connection means 53 may vary without deviating from the scope of the disclosure.

The upper surface 5 of the chassis 3 may further comprise docking means 55, arranged to receive a handle for a user riding on top of the vehicle. The docking means 55 is seen arranged to the side of the first loading surface 7. FIG. 4*b* shows a first end of a shaft 57 which is to be perceived to represent such a handle.

Figure 5A:
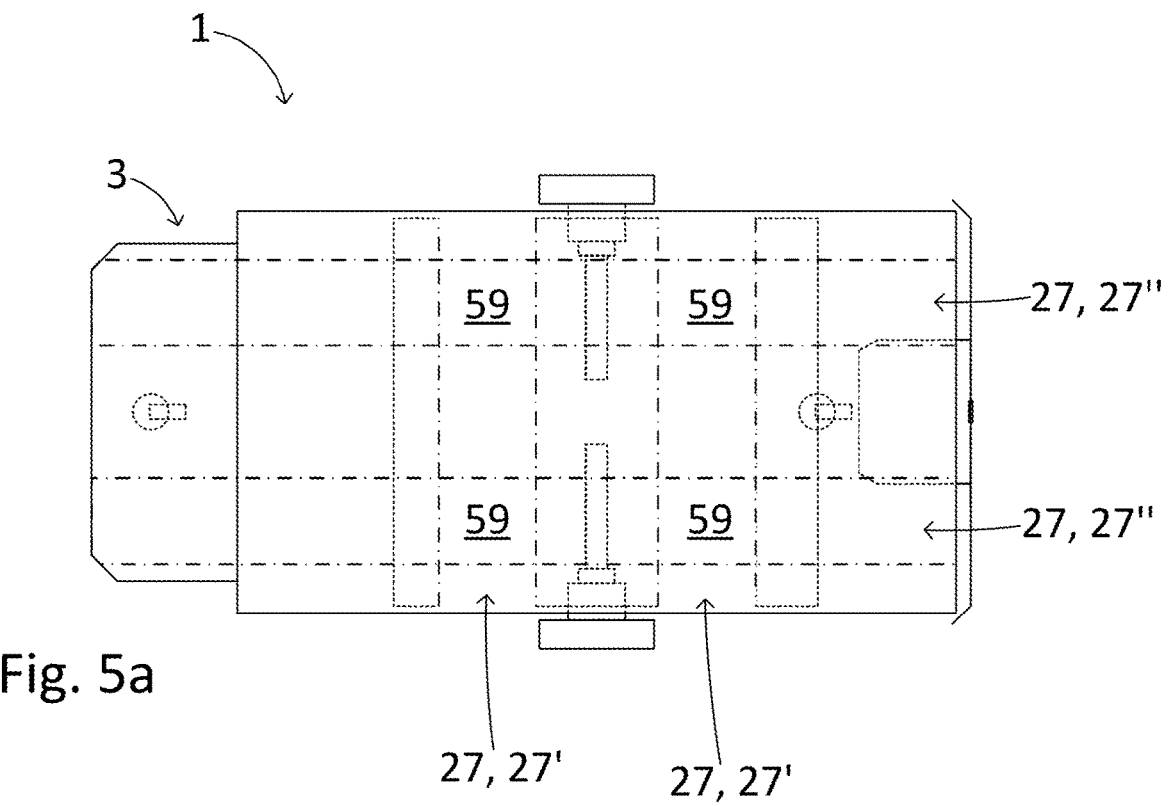
FIGS. 5a and 5b show a vehicle in a top down view and a side view respectively according to an embodiment.
Figure 5B:
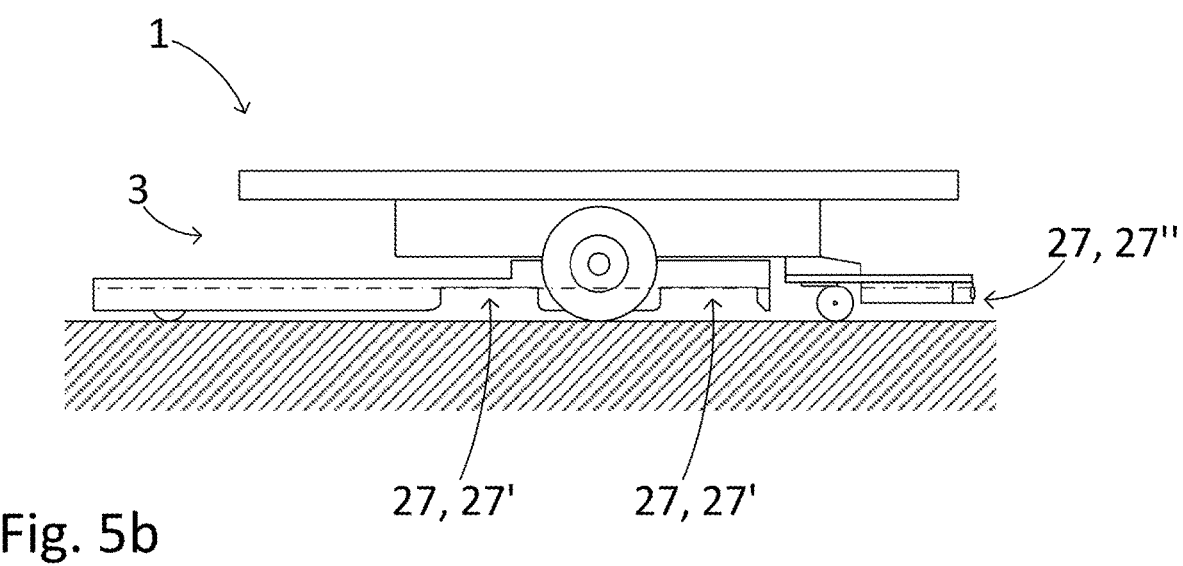

FIGS. 5*a* and 5*b* show a vehicle 1 in a top down view and a side view respectively according to an embodiment. The embodiment shown in FIGS. 5*a* and 5*b* comprises two additional openings 27", arranged perpendicular relative the two first openings 27, arranged so that the four openings 27, 27" define four opening intersections 59, which are positioned so that the center of gravity G of the vehicle 1 is positioned in-between the four intersections 59. According to this example all four openings 27, 27" are designed as tunnels 27' passing through the chassis 3.

Figure 6:
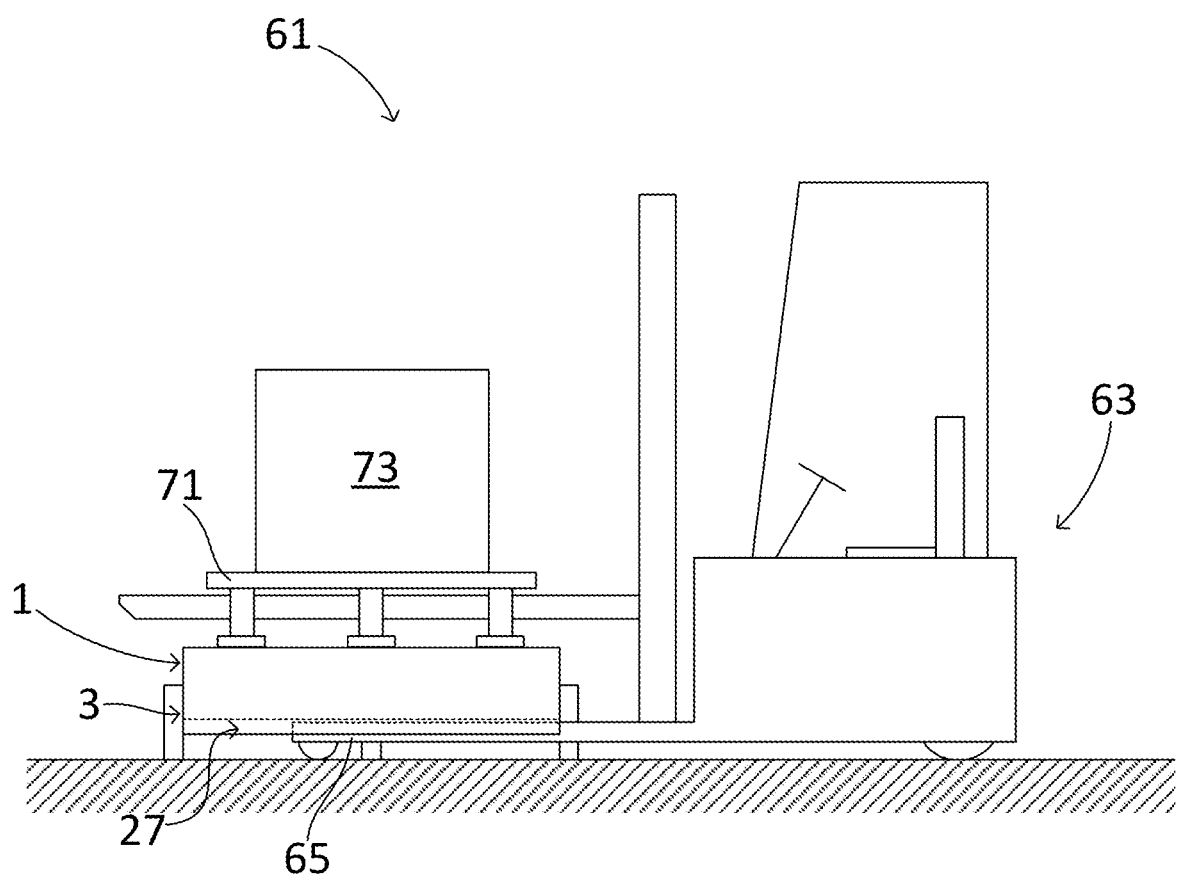
FIG. 6 shows a system comprising a vehicle and a forklift truck according to an embodiment.

FIG. 6 shows a system 61 comprising a vehicle 1 and a forklift truck 63 according to an embodiment. The forklift truck 63 depicted is a forklift truck 63 comprising support legs 65 with wheels 67 arranged at a front portion 69 of the support legs 65. The forklift truck 63 as depicted may be perceived to be about to lift a pallet 71 from the first loading surface 7 of the vehicle 1, which pallet 71 in turn has an object 73 positioned thereupon. As can be seen the support legs 65 may pass under the vehicle 1 due to the vehicle 1 comprising at least one tunnel-shaped opening 27 passing through the chassis 3. As should be obvious the vehicle 1 depicted may be one of the several embodiments exemplified herein, having any combination of features as described within the disclosure. The system 61 shown comprises one vehicle 1 and one forklift truck 63, however any number of such units may be disclosed within such a system 61.

The foregoing description of the embodiments has been furnished for illustrative and descriptive purposes. It is not intended to be exhaustive, or to limit the embodiments to the variants described. Many modifications and variations will obviously be apparent to one skilled in the art. The embodiments have been chosen and described in order to best explicate principles and practical applications, and to thereby enable one skilled in the art to understand the invention in terms of its various embodiments and with the various modifications that are applicable to its intended use. The components and features specified above may, within the framework of the embodiments, be combined between different embodiments specified.

The invention claimed is:

1. A material handling vehicle comprising:
   a chassis, comprising an upper surface on which a first loading surface is arranged, the chassis further comprises a plurality of components coupled thereto, the components including;
   a power source,
   a drive motor,
   at least one drive wheel powered by the drive motor,
   at least one stabilizing wheel,
   at least one object sensor for detecting objects in the surroundings of the vehicle,
   a wireless interface for communication with other units of a system,
   a control unit, and
   a navigation device,
   wherein the chassis further comprises at least one opening, arranged at a lowermost portion of the chassis, and extending from a first side portion of the chassis, the at least one opening being arranged to receive a material handling element, and comprises an upper abutment surface and sidewalls, extending along the extension of each opening.

2. The material handling vehicle according to claim 1, wherein the at least one opening is arranged so that a center of gravity (G) of the vehicle is positioned between a first outermost sidewall and a second outermost sidewall of the at least one opening.

3. The material handling vehicle according to claim 2, wherein the chassis comprises two openings extending parallel to each other, wherein the first and second outermost sidewalls are sidewalls of separate openings.

4. The material handling vehicle according to claim 3, wherein at least one of the openings are tunnel shaped, and extend through the vehicle to a second side portion of the chassis.

5. The material handling vehicle according to claim 3, wherein the chassis further comprises two additional openings, arranged perpendicular relative to the two first openings, arranged so that the four openings define four opening intersections, which are positioned so that the center of gravity (G) of the vehicle is positioned in-between the four intersections.

6. The material handling vehicle according to claim 1, further including at least one edge, wherein an edge being defined by an intersection of a sidewall of an opening and the lowermost portion of the chassis, comprises roller bearings, arranged horizontally along the longitudinal extension of each edge.

7. The material handling vehicle according to claim 3, wherein each sidewall of each opening of the chassis comprises a plurality of vertical roller bearings, arranged along each sidewall.

8. The material handling vehicle according to claim 3, wherein each opening of the chassis comprises cooling flanges, connected to at least one heat generating device of the vehicle.

9. The material handling vehicle according to claim 3, wherein at least one of the openings of the chassis comprises at least one sensor, for detecting the material handling element in a vicinity of the sensor, wherein input from the at least one sensor is used for selective interaction with the material handling element.

10. The material handling vehicle according to claim 1, wherein the upper surface of the chassis comprises connection means, arranged for receiving additional material handling devices.

11. The material handling vehicle according to claim 1, wherein the first loading surface of the chassis comprises a selectively rotational disc-shaped portion, wherein the first loading surface may be rotated relative the vehicle.

12. The material handling vehicle according to claim 1, wherein the upper surface of the chassis comprises docking means, arranged to receive a handle for a user riding on top of the vehicle.

13. The material handling vehicle according to claim 3, wherein at least one of the openings of the chassis comprises a charging interface for recharging of the power source.

14. The material handling vehicle according to claim 1, wherein the upper surface of the chassis comprises a second loading surface, wherein the first and second loading surfaces are arranged at separate heights relative to each other.

15. The material handling vehicle according to claim 1, further including at least one edge, wherein an edge being defined by an intersection of a sidewall of an opening and the lowermost portion of the chassis, is a bevelled edge.

16. A material handling system comprising: a group of material handling vehicles, the group of material handling vehicles comprises at least one of the vehicles according to claim 1, and at least one forklift truck.

* * * * *